(12) United States Patent
Gang et al.

(10) Patent No.: US 10,402,236 B2
(45) Date of Patent: Sep. 3, 2019

(54) EVENT-BASED DATA COLLECTION FOR SMART SENSORS ON AN ARBITRATING BUS

(71) Applicant: Simmonds Precision Products, Inc., Vergennes, VT (US)

(72) Inventors: Travis Gang, Hinesburg, VT (US); Matthew B. Burleigh, Essex, VT (US); Peter J. Carini, Underhill, VT (US)

(73) Assignee: Simmonds Precision Products, Inc., Vergennes, VT (US)

( * ) Notice: Subject to any disclaimer, the term of this patent is extended or adjusted under 35 U.S.C. 154(b) by 217 days.

(21) Appl. No.: 15/623,583

(22) Filed: Jun. 15, 2017

(65) Prior Publication Data
US 2018/0365083 A1 Dec. 20, 2018

(51) Int. Cl.
G06F 13/36 (2006.01)
G06F 9/54 (2006.01)
(Continued)

(52) U.S. Cl.
CPC .......... *G06F 9/542* (2013.01); *G06F 11/3006* (2013.01); *G06F 11/3013* (2013.01);
(Continued)

(58) Field of Classification Search
CPC ............... G06F 11/079; G06F 11/3006; G06F 11/3013; G06F 11/3027; G06F 11/3058; G06F 11/3072; G06F 11/3089; G06F 11/3476; G06F 2201/81; G06F 2201/86; G06F 13/1605; G06F 9/542; G06F 1/3206; G06F 1/3215; B64D 2045/0085; B64D 45/00; G01P 15/00; G01P 15/165; G01P 3/00; G01P 3/44; G05B 19/042; G05B 2219/2231; G05B 23/0264; G07C 3/10; G07C 5/00; G07C 5/002; G08B 21/182; G08B 25/04; G08B 29/04; G08B 29/188;
(Continued)

(56) References Cited

U.S. PATENT DOCUMENTS 5,195,046 A 3/1993 Gerardi et al.
6,122,758 A 9/2000 Johnson et al.
(Continued)

FOREIGN PATENT DOCUMENTS

WO WO2016027022 A1 2/2016

OTHER PUBLICATIONS

Extended European Search Report for EP Application No. 18177937. 2, dated Jan. 29, 2019, 12 Pages.

*Primary Examiner* — Farley Abad
*Assistant Examiner* — Richard B Franklin
(74) *Attorney, Agent, or Firm* — Kinney & Lange, P.A.

(57) ABSTRACT

A system and method includes an arbitrating data bus and a plurality of sensing nodes connected to communicate on the arbitrating data bus. The plurality of sensing nodes are configured to digitize and monitor a first amount of data during a listening mode of an event monitoring mode and detect an event based upon the first amount of data. The plurality of sensing nodes are further configured to output an event message to the arbitrating data bus upon detection of the event. The plurality of sensing nodes are further configured to digitize and retain a second amount of data following detection of the event message on the arbitrating data bus.

15 Claims, 2 Drawing Sheets

(51) Int. Cl.
    *G06F 13/16*     (2006.01)
    *G06F 11/30*     (2006.01)
    G06F 11/34     (2006.01)
    G05B 23/02     (2006.01)
    G06F 11/07     (2006.01)

(52) U.S. Cl.
    CPC ...... *G06F 11/3027* (2013.01); *G06F 11/3058* (2013.01); *G06F 11/3072* (2013.01); *G06F 11/3089* (2013.01); *G06F 13/1605* (2013.01); G05B 23/0264 (2013.01); G06F 11/079 (2013.01); G06F 11/3476 (2013.01); G06F 2201/81 (2013.01); G06F 2201/86 (2013.01)

(58) Field of Classification Search
    CPC ........ H03M 1/12; H04L 12/403; H04L 67/12; H04L 12/2823; H04L 12/2827; H04L 12/1895; H04L 12/2803; H04L 41/069; H04L 63/1416
    See application file for complete search history.

(56) References Cited

U.S. PATENT DOCUMENTS

| | | | |
|---|---|---|---|
| 8,131,839 B2 * | 3/2012 | Yu | G01D 21/00 370/252 |
| 8,140,658 B1 | 3/2012 | Gelvin et al. | |
| 9,380,068 B2 | 2/2016 | Iyer et al. | |
| 9,628,365 B2 | 4/2017 | Gelvin et al. | |
| 2007/0174022 A1 | 7/2007 | Wiles et al. | |
| 2015/0151960 A1 | 6/2015 | McCleland et al. | |

\* cited by examiner

EVENT-BASED DATA COLLECTION FOR SMART SENSORS ON AN ARBITRATING BUS

BACKGROUND

The present disclosure relates generally to data collection, and in particular to data collection based upon event detection for smart sensors on an arbitrating bus.

Condition monitoring systems are often used to monitor parameters in machinery. These systems include temperature sensors, pressure sensors, vibration sensors, and many other types of sensors, utilized to detect the development of faults. The data collected may be digitized, transformed and algorithmically processed to extract features of the monitored system. A given feature can be generated from the input of one sensor or could be dependent on the interaction of multiple sensors. Features extracted may be compared against expected values to assess the relative health of that feature. Sensor data may be monitored and evaluated on a scheduled basis and/or on an event basis. Event based monitoring is typically used to diagnose the circumstances leading to the event, identify the event, and diagnose the potential impacts of the event. Because of this, it is desirable to have data from all relevant sensors collected prior to, during, and after the event detection. This is typically accomplished by buffering data from sensors of interest, retaining the buffered data when an event is detected, and recording the additional post-event data.

Prior art condition monitoring systems included several analog sensors feeding into a central host for digitization and further processing. This implementation required individual cabling for each analog sensor which resulted in a heavy system that required a complicated installation. These issues can be mitigated by distributing digitization and processing of data out locally to the sensor. Local processing of data reduces the processing load on the host, allowing the host to perform other more complex functions, or decrease in size and complexity. Transmission of digital data allows multiple digital sensors to be connected on a single digital bus, reducing the wire weight associated with individual analog wire runs for each sensor.

In the prior art analog systems, the host was in control of all the data buffering as well as event detection, so data collection related to a detected event was relatively simple. With distributed processing, this data collection becomes more complex. It is desirable to develop methods of handling event detection and data collection for distributed processing sensor systems.

SUMMARY

A method of collecting data in a system that includes a plurality of sensing nodes connected via an arbitrating data bus includes entering, by the plurality of sensing nodes, an event monitoring mode, wherein each of the plurality of sensing nodes digitize and monitor first sensed data during a listening mode of the event monitoring mode; detecting, by a first one of the plurality of sensing nodes, a detected event based upon the first sensed data; outputting, by the first one of the plurality of sensing nodes, a first event message on the arbitrating data bus; detecting, by second ones of the plurality of sensing nodes, the first event message on the arbitrating data bus; and recording, by the first one and the second ones of the plurality of sensing nodes, second sensed data as first event data based upon the first event message during a first event collection mode of the event monitoring mode.

A system includes an arbitrating data bus and a plurality of sensing nodes connected to communicate on the arbitrating data bus. The plurality of sensing nodes are configured to digitize and monitor a first amount of data during a listening mode of an event monitoring mode and detect an event based upon the first amount of data. The plurality of sensing nodes are further configured to output an event message to the arbitrating data bus upon detection of the event. The plurality of sensing nodes are further configured to digitize and retain a second amount of data following detection of the event message on the arbitrating data bus.

DETAILED DESCRIPTION

A data collection system and method is disclosed herein that performs event detection for nodes on an arbitrating data bus. The system includes a plurality of sensing nodes, which may be digital sensors, for example. The sensing nodes enter an event monitoring mode, in which the sensing nodes first enter a listening mode to continually digitize and monitor an amount of data. When one of the sensing nodes detects an event during the listening mode, the respective sensing node outputs an event message on the arbitrating data bus. Upon detection of the event message on the arbitrating bus, one or more of the remaining sensing nodes exit the listening mode and record an additional amount of event data.

Figure 1:
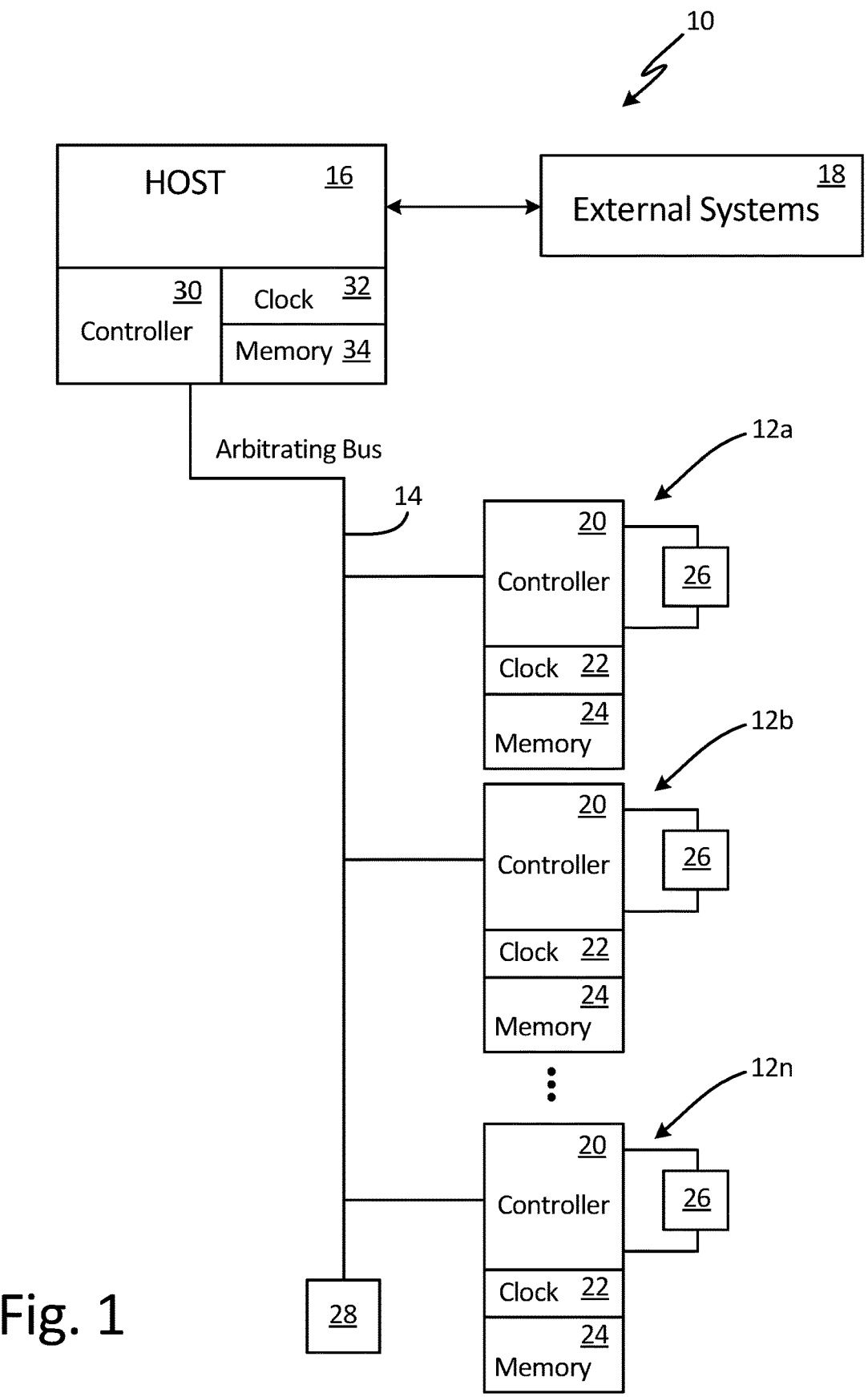
FIG. 1 is a block diagram illustrating sensing nodes connected to a host over an arbitrating data bus.

FIG. 1 is a block diagram illustrating system 10 that includes nodes 12a-12n connected on arbitrating bus 14. System 10 includes sensing nodes 12a-12n, arbitrating bus 14, host 16 and external systems 18. Each sensing node 12a-12n includes controller 20, timer/clock 22, memory 24 and sensing element 26. Arbitrating bus includes bus termination 28. Host 16 includes controller 30, timer/clock 32 and memory 34. Sensing nodes 12a-12n may be any nodes capable of sensing characteristics of the environment and may be digital sensors, for example, or digital interfaces for analog sensors. For example, nodes 12a-12n may be configured to sense temperature, vibration, speed, displacement, or any other characteristic. In one embodiment, system 10 may be a health and usage monitoring system (HUMS) onboard an aircraft. In other embodiments, system 10 may be any ground-based or airborne system configured to monitor characteristics of the environment.

Sensing nodes 12a-12n are connected to communicate with host 16 and other sensing nodes 12a-12n over arbitrating bus 14. Arbitrating bus 14 may implement any arbitrating bus communication protocol such as, for example, controller area network (CAN). In system 10, it may be desirable to perform event based monitoring to diagnose the circumstances leading to an event, to identify the event, and to diagnose the potential impacts of the event.

Host 16 may instruct one or more sensing nodes 12a-12n to enter an "event monitoring" mode, or sensing nodes 12a-12n may enter an "event monitoring" on its own, or based upon some other instruction. An event may be defined as any occurrence of one or more sensed values, and may be a single occurrence or a repeated occurrence. For example, an event may be defined as a vibration or temperature exceeding a threshold. The event may be defined by the respective sensing node 12a-12n itself, or may be provided to the respective sensing node 12a-12n from host 16 at the beginning of the event monitoring mode.

After entering the event monitoring mode, the respective sensing nodes 12a-12n may enter a listening mode. During the listening mode, each respective sensing node 12a-12n may continually digitize and monitor an amount of past data. The rate of collection, and amount of data retention, may be any quantities based on the needs of system 10. For example, if node 12a is a temperature sensor, sensing node 12a may digitize the value from sensing element 26 every millisecond and store the digitized data in memory 24 for a five minute rolling interval. The amount of data to collect and monitor may be known by the respective sensing node 12a-12n, or may be provided by host 16 at the beginning of the event monitoring mode.

While in listening mode, one or more of sensing nodes 12a-12n may be monitoring for the occurrence of an event. For example, while digitizing and recording an amount of past data, one or more sensing nodes 12a-12n may be monitoring the past data for the occurrence of an event. Once a sensing node 12a-12n detects the event, the respective sensing node 12a-12n may output an event message to arbitrating data bus 14. The event message may be any sequence of bits indicative of a detected event from a respective sensing node 12a-12n.

If multiple events are detected simultaneously, sensing node 12a-12n that has priority on arbitrating bus 14 will provide its message onto bus 14. The sensing node 12a-12n that does not have priority may wait until arbitrating bus 14 is open for communication. Upon arbitrating bus 14 becoming available for communication, the sensing node 12a-12n may provide indication to host 16 and/or other sensing nodes 12a-12n that an event was detected. However, because the time for the event has passed, the other sensing nodes 12a-12n may not be instructed to record data regarding the event.

Sensing nodes 12a-12n and host 16 monitor arbitrating bus 14 for the event message. Upon detecting an event message, the sensing nodes 12a-12n that are currently in listening mode may exit the listening mode, retain some or all of the past recorded data in respective memory 24, and record a desired amount of additional data as event data. The desired amount of additional data may be designated by the respective sensing node 12a-12n itself, or may be specified in the event message.

Upon detecting an event, a respective sensing node 12a-12n may record that an event was detected in respective memory 24. The respective sensing node 12a-12n may also utilize timer/clock 22 to record a time of the detected event. This recorded time may be based upon a system time, for example, or a duration since entering the event monitoring mode. For example, sensing node 12a-12n may reset timer/clock 22 upon entering the event monitoring mode, and then record the count of timer/clock 22 upon detecting the event as the event time.

Host 16 may also record a time in which an event message is seen on arbitrating bus 14. Like sensing nodes 12a-12n, host 16 may record the event time based upon a system time, for example, or a duration since entering the event monitoring mode. For example, host 16 may reset timer/clock 32 upon sensing nodes 12a-12n beginning the event monitoring mode, and then record the count of timer/clock 32 upon detecting the event message as the event time. Likewise, sensing nodes 12a-12n that did not detect the event may record the time in which the event message is seen on arbitrating bus 14.

Sensing nodes 12a-12n may send raw data back to host 16, or may perform local processing on the event data prior to sending the event data back to host 16. For example, if node 12a collects one thousand data points of event data, node 12a may filter the event data and provide only the one hundred most relevant data points to host 16. Because the event time may be recorded by each sensing node 12a-12n, and host 16, the data from all nodes 12a-12n may later be combined and correlated by host 16, or some other processing unit, based upon the event time. Additionally, the event time may be utilized by host 16, or some other processing unit, to extract individual features regarding the event from the data provided by sensing nodes 12a-12n. The individual features may be, for example, characteristics specific to the event. For example, a temperature or vibration profile may be extracted for a given detected event.

Upon completion of recording event data, sensing nodes 12a-12n may return to the listening mode and record and retain further data if an event duration has not completed. For example, host 16 may specify an event duration, or an event duration may be known by sensing nodes 12a-12n, prior to entering the event monitoring mode. Sensing nodes 12a-12n may continue to listen for events until the event duration has completed. Thus, following recording of event data, if the event duration has not completed, each sensing node 12a-12n may return to listening mode and monitor for the occurrence of an event.

While described as a sensing node 12a-12n detecting an event, host 16 may also output an event message on arbitrating bus 14. For example, external systems 18 may include avionics, additional sensing systems, and/or manual inputs from an operator. For example, a pilot of an aircraft may press a button in the cockpit to indicate an event has occurred. This indication may be received by host 16 and host 16 may then output an event message on arbitrating bus 14. Sensing nodes 12a-12n may see the event message on arbitrating bus 14 and act in accordance with the event message.

Figure 2:
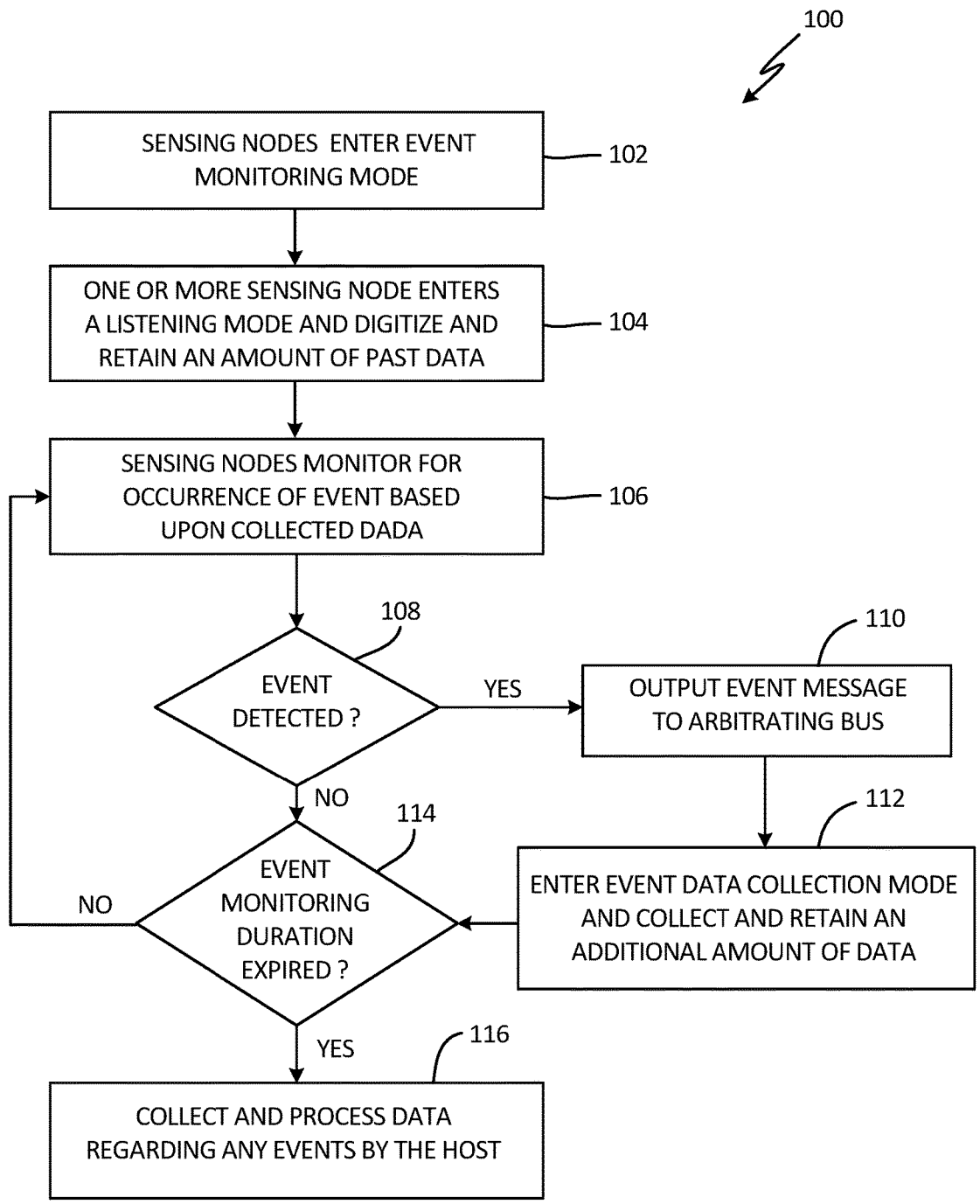
FIG. 2 is a flowchart illustrating a method of event-based data collection over an arbitrating data bus.

FIG. 2 is a flowchart illustrating method 100 of collecting data for system 10. At step 102, sensing nodes 12a-12n enter an event monitoring mode. When nodes 12a-12n enter event monitoring mode, host 16 may specify details for the event monitoring, or nodes 12a-12n may be programmed with the details for event monitoring, for example. These details may include, among others, an event monitoring duration and an event type. For example, host 16 may instruct sensing nodes 12a-12n to monitor for a vibration that exceeds a threshold for a specified time period.

At step 104, one or more sensing nodes 12a-12n enter a listening mode. During the listening mode, each sensing node 12a-12n may continuously digitize and monitor an amount of past data. The rate at which each sensing node 12a-12n samples and monitors data may be known by the respective node 12a-12n based upon the event type, or may be specified by host 16 when sensing nodes 12a-12n enter event monitoring mode, for example.

At step 106, the event is monitored for by at least one of sensing nodes 12a-12n. While all sensing nodes 12a-12n may be continually digitizing and monitoring data during listening mode, not all sensing nodes 12a-12n may be capable of detecting the specified event. For example, if monitoring for a vibration exceeding a threshold, a temperature sensor may not be able to detect the event. However, temperature data may be desired in conjunction with the vibration data in relation to the event. Thus, all sensing nodes 12a-12n may digitize and retain data, while any number of sensing nodes 12a-12n may be monitoring for occurrence of the specified event.

At step 108, if a sensing node 12a-12n detects an event, or an event is indicated by external systems 18, method 100 proceeds to step 110 and the respective sensing node 12a-12n or host 16 outputs an event message to arbitrating bus 14. The event message may indicate the detected event as well as contain other information. For example, the event message may specify which nodes 12a-12n should act upon the event message, and what data should be collected in response to the event message. If multiple events are detected simultaneously, sensing node 12a-12n that has priority on arbitrating bus 14 will provide its event message to bus 14. Any sensing nodes 12a-12n that detected an event and did not have priority on arbitrating bus 14 may wait until arbitrating bus 14 becomes available and provide an indication that a prior event was detected.

At step 112, sensing nodes 12a-12n enter an event data collection mode in which each sensing node 12a-12n records an amount of event data. The amount collected may be known by each of sensing nodes 12a-12n based upon the type of event, or may be specified by host 16 prior to the event detection. This may any desirable amount of data based upon the detected event.

If no event was detected at step 108, or if the event data collection at step 112 has completed, method 100 proceeds to step 114. At step 114, it is determined if an event monitoring duration has expired. If the duration has not expired, method 100 returns to step 106, and each sensing node 12a-12n continues in the listening mode. If the duration has completed, method 100 proceeds to step 116.

At step 116, host 16 or other central processing device, may obtain the data from sensing nodes 12a-12n regarding the detected event. This data may be preprocessed by one or more of sensing nodes 12a-12n, or may be provided as raw data to host 16. For example, host 16 may request the data one at a time from each individual sensing node 12a-12n over arbitrating bus 14. Host 16 may then process the data from sensing nodes 12a-12n to extract individual features regarding the event, for example.

Discussion of Possible Embodiments

The following are non-exclusive descriptions of possible embodiments of the present invention.

A method of collecting data in a system that includes a plurality of sensing nodes connected via an arbitrating data bus includes entering, by the plurality of sensing nodes, an event monitoring mode, wherein each of the plurality of sensing nodes digitize and monitor first sensed data during a listening mode of the event monitoring mode; detecting, by a first one of the plurality of sensing nodes, a detected event based upon the first sensed data; outputting, by the first one of the plurality of sensing nodes, a first event message on the arbitrating data bus; detecting, by second ones of the plurality of sensing nodes, the first event message on the arbitrating data bus; and recording, by the first one and the second ones of the plurality of sensing nodes, second sensed data as first event data based upon the first event message during a first event collection mode of the event monitoring mode.

The method of the preceding paragraph can optionally include, additionally and/or alternatively, any one or more of the following features, configurations and/or additional components:

A further embodiment of the foregoing method, further comprising monitoring, by a host node, the arbitrating data bus for the first event message.

A further embodiment of the foregoing method, further including exiting, by the plurality of sensing nodes, the event monitoring mode following completion of the first event collection mode; and obtaining, by the host node, the first and second sensed data from the plurality of sensing nodes based upon receipt of the first event message.

A further embodiment of the foregoing method, wherein obtaining, by the host node, the first and the second sensed data from the plurality of sensing nodes based upon receipt of the first event message includes processing, by the first one and the second ones of the plurality of sensing nodes, the first sensed data and the second sensed data as processed data; and providing, by the first one and the second ones of the plurality of sensing nodes, the processed data to the host node.

A further embodiment of the foregoing method, further including returning, by the plurality of sensing nodes, to the listening mode following completion of the first event collection mode.

A further embodiment of the foregoing method, further including commanding, by the host node, the plurality of sensing nodes to exit the event monitoring mode; and downloading, by the host node, all collected data from the plurality of nodes collected during the event monitoring mode.

A further embodiment of the foregoing method, further including exiting, by the plurality of sensing nodes, the event monitoring mode due to expiration of an event monitoring duration; and downloading, by the host node, all collected data from the plurality of nodes collected during the event monitoring mode.

A further embodiment of the foregoing method, wherein detecting, by second ones of the plurality of sensing nodes, the first event message on the arbitrating data bus includes designating, by the first one of the plurality of sensing nodes, the second ones of the plurality of sensing nodes as event collection nodes; and detecting, by the second ones of the plurality of sensing nodes, status as event collection nodes from the first event message.

A further embodiment of the foregoing method, further including detecting, by one of the second ones of the plurality of sensing nodes, a second event; waiting for the arbitrating bus to become available following transmission of the first event message; and providing a second event message on the arbitrating bus indicating that the second event was previously detected.

A further embodiment of the foregoing method, further including detecting, by the first one and the second ones of the plurality of sensing nodes, a second event message on the arbitrating data bus from an external node separate from the plurality of sensing nodes; and recording, by the first one and the second ones of the plurality of sensing nodes, third sensed data as second event data based upon the second event message during a second event collection mode of the event monitoring mode.

A further embodiment of the foregoing method, further including recording, by the first one of the plurality of sensing nodes, the detected event and an event detection time associated with the first event data based on a system definition of time or a duration from a start of the event monitoring mode.

A further embodiment of the foregoing method, further including extracting, by a host node, individual features regarding the detected event utilizing the first event data from the first one and the second ones of the plurality of sensing nodes.

A further embodiment of the foregoing method, further including correlating, by the host node, the first event data from the first one and the second ones of the plurality of sensing nodes using the event detection time.

A system includes an arbitrating data bus and a plurality of sensing nodes connected to communicate on the arbitrating data bus. The plurality of sensing nodes are configured to digitize and monitor a first amount of data during a listening mode of an event monitoring mode and detect an event based upon the first amount of data. The plurality of sensing nodes are further configured to output an event message to the arbitrating data bus upon detection of the event. The plurality of sensing nodes are further configured to digitize and retain a second amount of data following detection of the event message on the arbitrating data bus.

The system of the preceding paragraph can optionally include, additionally and/or alternatively, any one or more of the following features, configurations and/or additional components:

A further embodiment of the foregoing system, further comprising a host node configured to monitor the arbitrating data bus for the event message.

A further embodiment of any of the foregoing systems, wherein the plurality of sensing nodes exit the event monitoring mode following retention of the second amount of data, and wherein the host node obtains the first and the second amounts of data from the plurality of sensing nodes based upon receipt of the first event message.

A further embodiment of any of the foregoing systems, wherein the plurality of sensing nodes are configured to process the first and the second amounts of data as processed data and provide the processed data to the host node.

A further embodiment of any of the foregoing systems, wherein the plurality of sensing nodes are further configured to record detection of the event and an event detection time upon detection of the event.

A further embodiment of any of the foregoing systems, wherein the host node is configured to extract individual features regarding the event utilizing the first and second amounts of data from the plurality of sensing nodes.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of collecting data in a system that includes a plurality of sensing nodes connected via an arbitrating data bus, the method comprising:
    entering, by the plurality of sensing nodes, an event monitoring mode, wherein each of the plurality of sensing nodes digitize and monitor first sensed data during a listening mode of the event monitoring mode;
    detecting, by a first one of the plurality of sensing nodes, a detected event based upon the first sensed data;
    outputting, by the first one of the plurality of sensing nodes, a first event message on the arbitrating data bus;
    detecting, by second ones of the plurality of sensing nodes, the first event message on the arbitrating data bus;
    recording, by the first one and the second ones of the plurality of sensing nodes, second sensed data as first event data based upon the first event message during a first event collection mode of the event monitoring mode;
    monitoring, by a host node, the arbitrating data bus for the first event message;
    exiting, by the plurality of sensing nodes, the event monitoring mode following completion of the first event collection mode; and
    obtaining, by the host node, the first and second sensed data from the plurality of sensing nodes based upon receipt of the first event message.

2. The method of claim 1, wherein obtaining, by the host node, the first and the second sensed data from the plurality of sensing nodes based upon receipt of the first event message comprises:
    processing, by the first one and the second ones of the plurality of sensing nodes, the first sensed data and the second sensed data as processed data; and
    providing, by the first one and the second ones of the plurality of sensing nodes, the processed data to the host node.

3. The method of claim 1, further comprising returning, by the plurality of sensing nodes, to the listening mode following completion of the first event collection mode.

4. The method of claim 3, further comprising:
    commanding, by the host node, the plurality of sensing nodes to exit the event monitoring mode; and
    downloading, by the host node, all collected data from the plurality of nodes collected during the event monitoring mode.

5. The method of claim 3, further comprising:
    exiting, by the plurality of sensing nodes, the event monitoring mode due to expiration of an event monitoring duration; and
    downloading, by the host node, all collected data from the plurality of nodes collected during the event monitoring mode.

6. The method of claim 1, wherein detecting, by second ones of the plurality of sensing nodes, the first event message on the arbitrating data bus comprises:
    designating, by the first one of the plurality of sensing nodes, the second ones of the plurality of sensing nodes as event collection nodes; and
    detecting, by the second ones of the plurality of sensing nodes, status as event collection nodes from the first event message.

7. The method of claim 1, further comprising:
    detecting, by one of the second ones of the plurality of sensing nodes, a second event;
    waiting for the arbitrating bus to become available following transmission of the first event message; and
    providing a second event message on the arbitrating bus indicating that the second event was previously detected.

8. The method of claim 1, further comprising:
    detecting, by the first one and the second ones of the plurality of sensing nodes, a second event message on the arbitrating data bus from an external node separate from the plurality of sensing nodes; and
    recording, by the first one and the second ones of the plurality of sensing nodes, third sensed data as second event data based upon the second event message during a second event collection mode of the event monitoring mode.

9. The method of claim 1, further comprising:
recording, by the first one of the plurality of sensing nodes, the detected event and an event detection time associated with the first event data based on a system definition of time or a duration from a start of the event monitoring mode.

10. The method of claim 9, further comprising:
extracting, by a host node, individual features regarding the detected event utilizing the first event data from the first one and the second ones of the plurality of sensing nodes.

11. The method of claim 10, further comprising:
correlating, by the host node, the first event data from the first one and the second ones of the plurality of sensing nodes using the event detection time.

12. A system comprising:
an arbitrating data bus;
a plurality of sensing nodes connected to communicate on the arbitrating data bus; and
a host node configured to monitor the arbitrating data bus for the event message;
wherein the plurality of sensing nodes are configured to digitize and retain a first amount of data during a listening mode of an event monitoring mode and detect an event based upon the first amount of data; and
wherein the plurality of sensing nodes are further configured to output an event message to the arbitrating data bus upon detection of the event; and
wherein the plurality of sensing nodes are further configured to digitize and retain a second amount of data following detection of the event message on the arbitrating data bus; and
wherein the plurality of sensing nodes exit the event monitoring mode following retention of the second amount of data; and
wherein the host node obtains the first and the second amounts of data from the plurality of sensing nodes based upon receipt of the first event message.

13. The system of claim 12, wherein the plurality of sensing nodes are configured to process the first and the second amounts of data as processed data and provide the processed data to the host node.

14. The system of claim 12, wherein the plurality of sensing nodes are further configured to record detection of the event and an event detection time upon detection of the event.

15. The system of claim 14, wherein the host node is configured to extract individual features regarding the event utilizing the first and second amounts of data from the plurality of sensing nodes.

* * * * *